United States Patent [19]

Schiemann et al.

[11] Patent Number: 4,671,649
[45] Date of Patent: Jun. 9, 1987

[54] DRIVING MECHANISM FOR AN EXPOSURE CARRIAGE OF A COPYING MACHINE

[75] Inventors: Roland Schiemann, Leonberg; Fritz Haas, Eberdingen, both of Fed. Rep. of Germany

[73] Assignee: Develop Dr. Eisbein GmbH & Co., Fed. Rep. of Germany

[21] Appl. No.: 857,996

[22] Filed: May 1, 1986

[30] Foreign Application Priority Data

May 10, 1985 [DE] Fed. Rep. of Germany ....... 3516833

[51] Int. Cl.$^4$ ...................... G03B 27/48; G03G 15/28
[52] U.S. Cl. .......................................... 355/51; 355/8
[58] Field of Search .................... 355/8, 11, 51, 57, 66

[56] References Cited

U.S. PATENT DOCUMENTS 3,877,807 4/1975 Kurita ....................................... 355/8
4,384,784 5/1983 Mayer ....................................... 355/8

Primary Examiner—Monroe H. Hayes
Attorney, Agent, or Firm—Barnes & Thornburg

[57] ABSTRACT

A chain drive arrangement is disclosed for movably driving an exposure carriage of a photocopying machine. The chain drive includes an endless chain running over two spaced apart chain gears. A carrying pin is arranged on the chain which engages into a connecting link slot transversely to the travel direction of the chain. The connecting link slot is arranged at a carrying lever of the exposure carriage. In order to accommodate movement of the exposure carriage to an intermediate or neutral position so it can be removed independently of the position in which the driving mechanism is stopped, a readily manually detachable connection is provided between the carrying pin and the carrying lever. A leaf spring hingedly connects the carrying lever to the exposure carriage and biases the lever to a connection with the carrying pin. Manual pressure against an upwardly protruding gripping flange of the lever operates against the leaf spring force to disengage the lever slot and carrying pin so the carriage can be removed.

25 Claims, 2 Drawing Figures

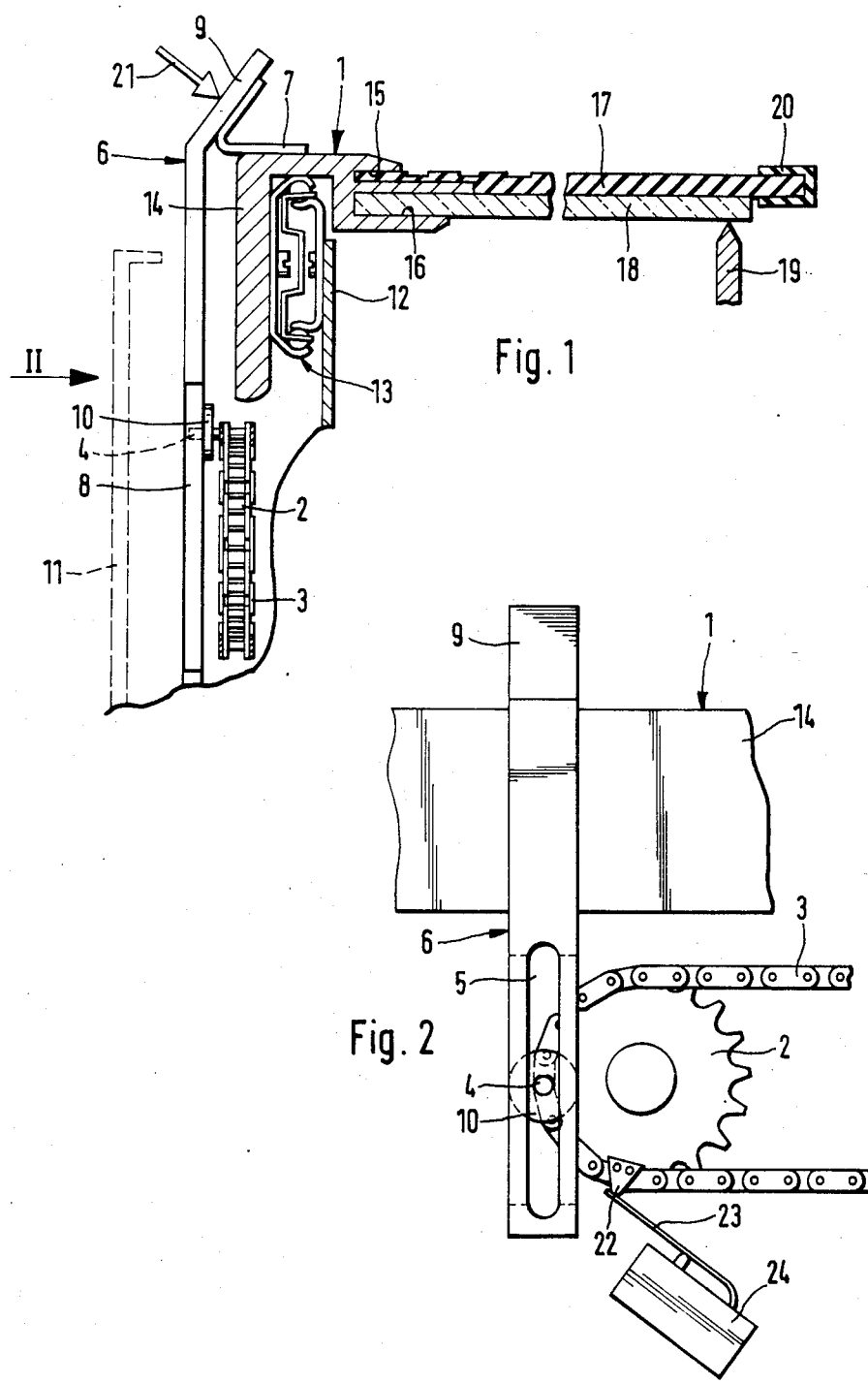

DRIVING MECHANISM FOR AN EXPOSURE CARRIAGE OF A COPYING MACHINE

BACKGROUND AND SUMMARY OF THE INVENTION

The invention relates to a driving mechanism for an exposure carriage of a copying machine which has an endless drive chain traveling over two chain cogs or wheels. A carrying pin is arranged in the drive chain which engages into a connecting link of a carrying lever of the exposure carriage, which connecting link extends transverse to the travel direction of the chain.

In a copying machine it is as a rule desired that also in the event of a disturbance of the driving mechanism that the exposure carriage can be brought to its end position into which it can be manually displaced. According to a known copying machine with a driving mechanism of the above-mentioned kind, described in German Unexamined Published Patent Application No. (DE-OS) 26 06 458, it is therefore provided to have clutch elements in the driving mechanism against which the exposure carriage can be brought manually to its end position also during a disturbance in the driving mechanism.

The invention is based upon the problem to so simplify a driving mechanism of the above-mentioned kind that clutch elements or the like are not needed and that however, the exposure carriage can be brought manually to its end position during a disturbance of the driving mechanism.

This problem is thereby solved by providing a detachable connection between the carrying pin and the carrying lever.

Through the arrangement of the invention, it is possible to interrupt the carrying connection between the exposure carriage and the chain so that the exposure carriage can be moved independently of the chain. Expensive clutch elements, one way clutches, locking devices or the like, are not necessary. It is furthermore contemplated in certain preferred embodiments of the invention to connect the chain drive mechanism directly fixedly at a driving motor.

In further arrangements of preferred embodiments of the invention, it is provided that the carrying lever is movably arranged at the exposure carriage so that it can be movable away from the carrying pin. It is advantageously provided according to certain embodiments that the carrying lever is resiliently biased with a loading spring towards its operational position. Thereby it is assured that the connection between the carrying lever and the chain is not automatically released or loosened.

In further developments of preferred embodiments of the invention, it is provided that the carrying lever is provided with inlet bevels for the carrying pin in the region of both outer sides of the connecting link or slot. Thereby, it is assured that during a switching on of the driving mechanism the carrying pin is automatically latched into the connecting link of the carrying lever so that the driving connection with advancing of the carrying pin after an advancement against the carrying lever is automatically achieved so that the chain can catch the lever with the carrying pin in each desired position.

In an especially advantageous embodiment of the invention, it is provided that the carrying lever is fastened by means of a leaf spring at the exposure carriage, which leaf spring is movable in the direction transverse to the travel direction of the exposure carriage. Such a leaf spring offers the advantage that on the one hand it can transfer without further requirements the necessary forces for the driving of the exposure carriage, while on the other hand it permits selective movement of the carrying lever in the direction transverse thereto, without requiring an auxiliary linkage or a hinge or the like to be provided.

In further arrangements of the invention, it is provided that the carrying lever extends upwardly above the exposure carriage with a gripping flange. Thereby the carrying lever is accessible from the outside without further requirements so that also an unskilled person can release the connection between the exposure carriage and the chain in order to bring the exposure carriage to the end position. This is especially advantageous, especially with a small compact copying device of the type for which the driving mechanism for the exposure carriage is adapted especially advantageously wherein elimination of the disturbance is not to be carried out at the location of the installation. Such copying machines would as a rule be sent back to the factory or the workshop of the technical customer service unit. For this purpose the exposure carriage should be moved to its end position in order to facilitate the insertion of the copying machine into the original packing.

Further objects, features, and advantages of the present invention will become more apparent from the following description when taken with the accompanying drawings which show, for purposes of illustration only, an embodiment/several embodiments in accordance with the present invention.

BRIEF DESCRIPTION OF THE DRAWINGS

FIG. 1 is a partial sectional view through a photocopy machine exposure carriage which depicts a driving mechanism constructed in accordance with a preferred embodiment of the invention; and FIG. 2 is a partial view taken in the direction of the arrow II of FIG. 1.

DETAILED DESCRIPTION OF THE DRAWINGS

The exposure carriage 1 illustrated in the drawings includes a glass plate 18 upon which the material to be copied is placed. The glass plate 18 is fixed at one longitudinal edge in a receptacle groove 16 of a guide rail 14, which rail 14 is fastened at a slide guide 13 at a wall 12 of a photocopying machine. In the region of its other side edge, the glass plate 18 is disposed on a knife edge guide 19. The guide rail 14 includes a further receptacle groove 15 above the receptacle 16 for the glass plate 18. A rubber or elastic cover 17 is inserted in receptacle groove 15, which cover 17 exhibits a thin section in the region of this receptacle 15 which functions as a kind of hinge connection. The rubber cover plate 17 protrudes over the glass plate 18 in the region of the knife edge guide 19 and is there provided with a grip 20. In operation, the grip 20 is manually grasped and flexible cover plate 17 is lifted, a sheet of paper or other material to be copied is placed on the glass plate 18 and the cover plate 17 is placed thereover for the actual copying steps.

A carrying lever 6 is fastened at the guide rail 14 of the exposure carriage 1, which lever 6 includes a vertically extending slot-shaped connecting linkage 5. A carrying pin 4 protrudes into the connecting linkage slot 5 and is fastened at a roller chain 3 which extends endlessly about two spaced apart chain wheels 2 (only one chain wheel being illustrated), which chain wheels 2 are so arranged that the roller chain 3 extends essentially in a direction parallel to the travel or sliding direction of guide 13. One of the chain wheels 2 is connected at a not illustrated driving motor by means of a driving mechanism, advantageously a chain driving mechanism without interposition of a clutch or the like.

As also can be seen in FIG. 2, a switch cam 22 is arranged at the roller chain 3 for controlling a switch arm or lever 23. Switch arm/lever 23 controls micro switch means 24, which in turn controls further functional elements of the copying machine, for example the on and off switch of an exposure device.

In order to release the carrying connection between the carrying pin 4 and the carrying lever 6 to facilitate a return movement of the exposure carriage 1 to its neutral end position upon a disturbance of the driving mechanism, it is provided that the carrying lever 6 with its connecting linkage slot 5 is movable out away from the carrying pin 4. For this purpose the carrying lever 6 is fastened at the guide rail 14 by means of an angular-shaped leaf spring 7. The angular formed leaf spring 7 is fastened with one leg at the guide rail 14 and with the other leg at a gripping flange 9 of the carrying lever 6, which gripping flange 9 is arranged extending diagonally toward the middle of the copying machine under an angle of approximately 45°. The angle-shaped leaf spring 7 forms a hinge connection extending parallel to the travel direction of the exposure carriage 1 and accommodates pivotable movement of the carrying lever 6 upon a loading force of the gripping flange 9 in the direction of the arrow 21. Through this pivoting movement, which can be accomplished manually by a servicing person, the carrying lever 6 with its connecting linkage slot 5 is lifted out away from the carrying pin 4 so that the connection between the roller chain 3 and the exposure carriage 1 is interrupted and the same can be selectively displaced.

The carrying lever 6 is provided inlet bevels 8 at both sides of connecting linkage slot 5 along the region of possible engagement positions of the carrying pin 4. These bevels 8 facilitate protrusion of the carrying pin 4 into the slot 5 in response to the spring force of leaf spring 7 against the lever 6 when the forces in the direction of arrow 21 is released.

As can be seen in FIGS. 1 and 2, the carrying lever 6 protrudes above the exposure carriage 1 with gripping flange 9 protruding out of the dash line illustrated copying machine cover 11 (FIG. 1) and is accessible without any kind of dismantling being required.

As can be further seen in FIGS. 1 and 2, the carrying pin 4 is connected with an abutment disk 10 disposed at a distance with respect to the roller chain 3. Abutment disk 10 delimits the driving position of the carrying lever 6 when it is biased toward the operating position by means of the angle-shaped leaf spring 7. Because of this abutment disk 10 it is prevented that the carrying lever 6 rubs against the roller chain 3 and/or chain wheels 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Photocopy machine apparatus including drive interconnecting means for drivingly interconnecting a powered driving means and a movable exposure carriage means of a photocopying machine; said drive interconnecting means comprising:
   a first interconnecting means movable with said driving means,
   a second interconnecting means movable with said carriage means,
   and manually operable detachable connection means for accommodating a readily detachable connection between the first and second interconnecting means, said detachable connection means comprising a manually operable carrying lever carrying one of said first and second interconnecting means and being operable in response to pivotal movement of the carrying lever to disengage the driving connection means and permit manual movement of the carriage means to a neutral servicing position.

2. Apparatus according to claim 1, wherein said first interconnecting means includes a carrying pin adapted to be carried by the driving means and extending transverse to the travel direction of the driving means,
   wherein said second interconnecting means is carried by the carrying lever, said carrying lever being adapted to be carried by the carriage means, and
   wherein said detachable connection means includes connecting link means at said carrying lever, said connecting link means being selectively drivingly engageable with the carrying pin.

3. Apparatus according to claim 2, wherein said connecting link means includes slot means in said carrying lever, said slot means being configured to be selectively engaged by said carrying pin.

4. Apparatus according to claim 3, wherein said second interconnecting means includes movable mounting means attaching said carrying lever at said carriage means so that said carrying lever is selectively movable between an operating position with said slot means engaging said carrying pin and an inoperative position with said slot means disengaged from said carrying pin.

5. Apparatus according to caim 4, wherein said movable mounting means includes spring means biasing the carrying lever towards the operating position.

6. Apparatus according to claim 4, wherein both sides of the slot means are provided with inlet bevels facing the carrying pin for accommodating guided entry of the carrying pin into the slot means.

7. Apparatus according to claim 5, wherein both sides of the slot means are provided with inlet bevels facing the carrying pin for accommodating guided entry of the carrying pin into the slot means.

8. Apparatus according to claim 5, wherein said spring means includes a leaf spring attached to the carriage means and the carrying lever, said leaf spring accommodating movement of the carrying lever transverse to the travel direction of the carriage means.

9. Apparatus according to claim 7, wherein said spring means includes a leaf spring attached to the carriage means and the carrying lever, said leaf spring accommodating movement of the carrying lever transverse to the travel direction of the carriage means.

10. Apparatus according to claim 2, wherein said carrying lever protrudes upwardly and includes a manually operable gripping flange disposed above a cover for the copying machine.

11. Apparatus according to claim 8, wherein said carrying lever protrudes upwardly and includes a manually operable gripping flange disposed above a cover for the copying machine.

12. Apparatus according to claim 11, wherein said gripping flange is disposed for accommodating pivotal movement of the lever about a fulcrum formed by said spring means.

13. Apparatus according to claim 4, wherein said carrying pin is fixedly attached to the driving means.

14. Apparatus according to claim 4, further comprising driving means in the form of an endless chain guided over at least two chain guide wheels.

15. Apparatus according to claim 14, wherein said carrying pin is fixedly attached to the chain.

16. Apparatus according to claim 15, wherein said movable mounting means includes spring means biasing the carrying lever towards the operating position.

17. Apparatus according to claim 16, wherein both sides of the slot means are provided with inlet bevels facing the carrying pin for accommodating guided entry of the carrying pin into the slot means.

18. Apparatus according to claim 17, wherein said spring means includes a leaf spring attached to the carriage means and the carrying lever, said leaf spring accommodating movement of the carrying lever transverse to the travel direction of the carriage means.

19. Apparatus according to claim 1, wherein the exposure carriage means includes means for carrying an original document to be copied.

20. Apparatus according to claim 19, wherein the first interconnecting means includes a slotted section on a lower part of the carrying lever, and wherein the second interconnecting means is a pin carried by a flexible driving member and engageable in the slotted section.

21. Apparatus according to claim 20, wherein said flexible driving member is a drive chain.

22. Apparatus according to claim 1, wherein the first interconnecting means includes a slotted section on a lower part of the carrying lever, and wherein the second interconnecting means is a pin carried by a flexible driving member and engageable in the slotted section.

23. Apparatus according to claim 22, wherein said flexible driving member is a drive chain.

24. Apparatus according to claim 1, wherein said carrying lever protrudes above the level of the carriage means.

25. Apparatus according to claim 20, wherein said carrying lever protrudes above the level of the carriage means.

* * * * *